US008040821B2

(12) United States Patent
Higuchi et al.

(10) Patent No.: US 8,040,821 B2
(45) Date of Patent: Oct. 18, 2011

(54) SWITCHING DEVICE, SWITCHING METHOD, AND SWITCH CONTROL PROGRAM

(75) Inventors: Junichi Higuchi, Tokyo (JP); Youichi Hidaka, Tokyo (JP); Mikiharu Yamashita, Tokyo (JP); Yukihiro Hara, Tokyo (JP)

(73) Assignee: NEC Corporation, Tokyo (JP)

( * ) Notice: Subject to any disclaimer, the term of this patent is extended or adjusted under 35 U.S.C. 154(b) by 57 days.

(21) Appl. No.: 11/915,699

(22) PCT Filed: Jun. 2, 2006

(86) PCT No.: PCT/JP2006/311085

§ 371 (c)(1),
(2), (4) Date: Nov. 27, 2007

(87) PCT Pub. No.: WO2006/129789

PCT Pub. Date: Dec. 7, 2006

(65) Prior Publication Data

US 2009/0028140 A1 Jan. 29, 2009

(30) Foreign Application Priority Data

Jun. 2, 2005 (JP) ................................ 2005-162753

(51) Int. Cl.
*H04L 12/28* (2006.01)
*H04L 12/50* (2006.01)
*H04Q 11/00* (2006.01)

(52) U.S. Cl. ......................... 370/254; 370/387; 370/388

(58) Field of Classification Search ........................ None
See application file for complete search history.

(56) References Cited

U.S. PATENT DOCUMENTS

| | | | | |
|---|---|---|---|---|
| 6,747,971 | B1 * | 6/2004 | Hughes et al. | 370/387 |
| 6,876,649 | B1 * | 4/2005 | Beshai | 370/355 |
| 7,426,185 | B1 * | 9/2008 | Musacchio et al. | 370/235.1 |
| 2002/0116503 | A1 * | 8/2002 | Kamiya | 709/227 |

FOREIGN PATENT DOCUMENTS

| | | | |
|---|---|---|---|
| JP | 4-326837 | A | 11/1992 |
| JP | 5-336555 | A | 12/1993 |
| JP | 6-6843 | A | 1/1994 |
| JP | 6-70347 | A | 3/1994 |
| JP | 6-120973 | A | 4/1994 |
| JP | 7-87094 | A | 3/1995 |
| JP | 2002-152267 | A | 5/2002 |
| JP | 2002-325087 | A | 11/2002 |

* cited by examiner

*Primary Examiner* — Gregory Sefcheck
*Assistant Examiner* — Ashley Shivers
(74) *Attorney, Agent, or Firm* — Sughrue Mion, PLLC

(57) ABSTRACT

A switching device includes an input stage switch group 1-1 including a plurality of input lines, an output stage switch group 1-3 including a plurality of output lines, an intermediate stage switch group 1-2 arranged between the input stage switch group and the output stage switch group, and a scheduler 1-22 deciding a signal path of each of intermediate stage switches 1-21 in the intermediate stage switch group based on information input to the respective input lines. The intermediate stage switch group is divided into a plurality of groups, a plurality of the schedulers is arranged in a distributed fashion to correspond to the plurality of groups, respectively and the schedulers operate independently of one another.

10 Claims, 19 Drawing Sheets

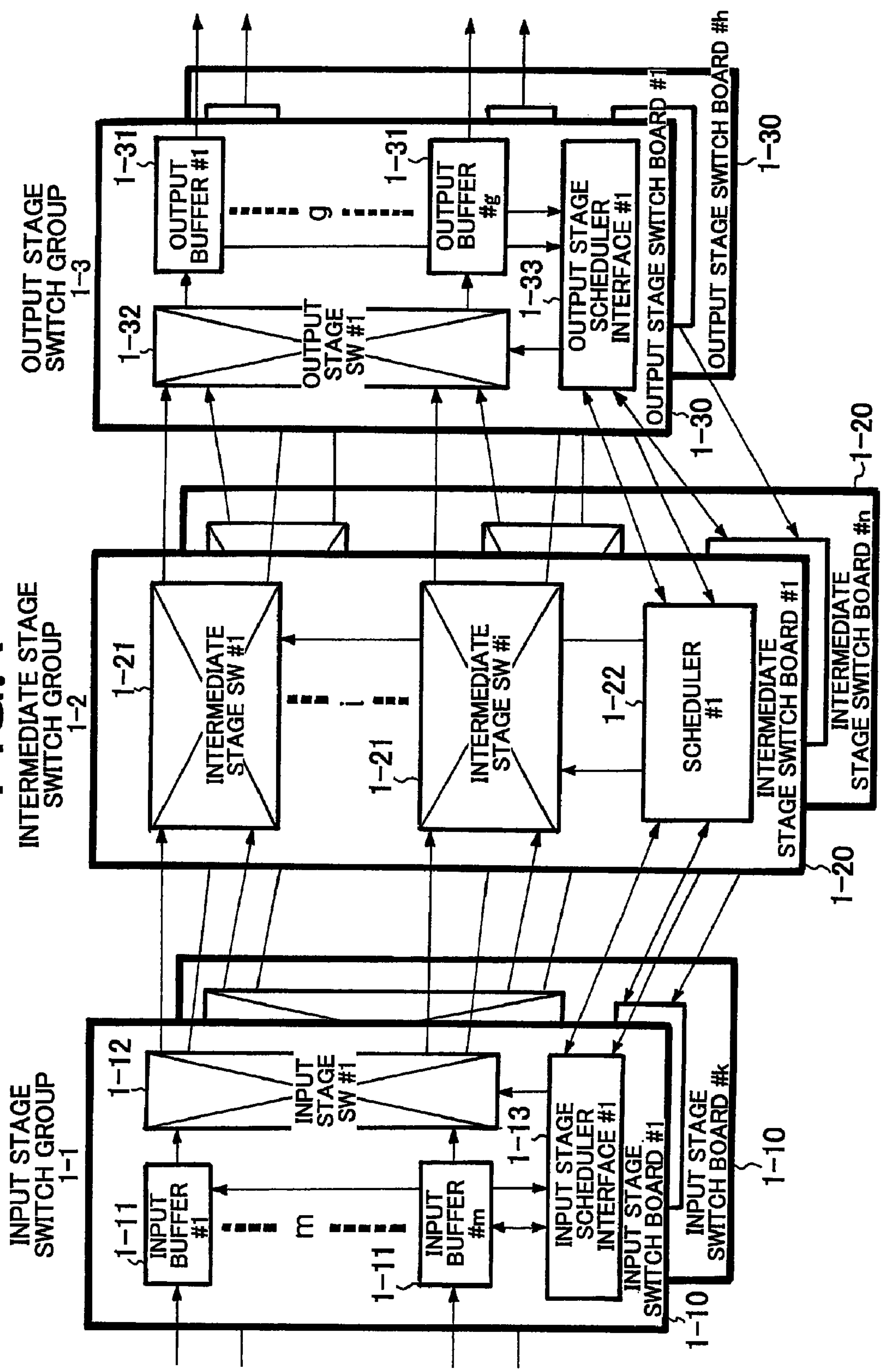
FIG. 1
INPUT STAGE SWITCH GROUP 1-1
INTERMEDIATE STAGE SWITCH GROUP 1-2
OUTPUT STAGE SWITCH GROUP 1-3
1-11
INPUT BUFFER #1
m
INPUT BUFFER #m
1-12
INPUT STAGE SW #1
1-13
INPUT STAGE SCHEDULER INTERFACE #1
INPUT STAGE SWITCH BOARD #1
INPUT STAGE SWITCH BOARD #k
1-10
1-21
INTERMEDIATE STAGE SW #1
i
INTERMEDIATE STAGE SW #i
1-22
SCHEDULER #1
INTERMEDIATE STAGE SWITCH BOARD #1
INTERMEDIATE STAGE SWITCH BOARD #n
1-20
1-31
OUTPUT BUFFER #1
g
OUTPUT BUFFER #g
1-32
OUTPUT STAGE SW #1
1-33
OUTPUT STAGE SCHEDULER INTERFACE #1
OUTPUT STAGE SWITCH BOARD #1
OUTPUT STAGE SWITCH BOARD #h
1-30

1-13
INPUT STAGE SCHEDULER INTERFACE #1
2-1
REQUEST ISSUING UNIT
2-2
PERMISSION RECEIVING UNIT
SCHEDULER #1
SCHEDULER #n
SCHEDULER #1
SCHEDULER #n
INPUT BUFFER #1
INPUT BUFFER #m
INPUT BUFFER #1
INPUT BUFFER #m
INPUT STAGE SWITCH #1

SCHEDULER #1
INPUT STAGE SWITCH BOARD
DESTINED FOR 5
DESTINED FOR 2
DESTINED FOR 9
DESTINED FOR 1
DESTINED FOR 8
DESTINED FOR 7
DESTINED FOR 6
1
2
3
4
5
6
7
8
9
INPUT STAGE SWITCH
SCD I/F
1
2
3
INPUT BUFFER
INTERMEDIATE STAGE SWITCH #1
INTERMEDIATE STAGE SWITCH #2
INTERMEDIATE STAGE SWITCH #3
INTERMEDIATE STAGE SWITCH #4
SCHEDULER #2
OUTPUT STAGE SWITCH BOARD
OUTPUT STAGE SWITCH
OUTPUT BUFFER

FIG.6

TABLE 1 PRIORITY CONTROL TABLE #

| REFERENCE LINE | INPUT LINE NUMBER | REFERENCE LINE | INPUT STAGE SWITCH BOARD NUMBER |
|---|---|---|---|
| 1 | 1 | 1 | 1 |
| 2 | 2 | 2 | 2 |
| 3 | 3 | 3 | 3 |

TABLE 2 PRIORITY CONTROL TABLE #2

| REFERENCE LINE | INPUT LINE NUMBER | REFERENCE LINE | INPUT STAGE SWITCH BOARD NUMBER |
|---|---|---|---|
| 1 | 3 | 1 | 3 |
| 2 | 2 | 2 | 2 |
| 3 | 1 | 3 | 1 |

FIG.7

TABLE 3 REQUEST TABLE

| | INPUT LINE NUMBER #1 | INPUT LINE NUMBER #2 | INPUT LINE NUMBER #3 |
|---|---|---|---|
| INPUT STAGE SWITCH BOARD NUMBER #1 | DESTINED FOR #2 5 | DESTINED FOR #1 2 | NOTHING |
| INPUT STAGE SWITCH BOARD NUMBER #2 | NOTHING | DESTINED FOR #3 9 | DESTINED FOR #1 1 |
| INPUT STAGE SWITCH BOARD NUMBER #3 | DESTINED FOR #3 8 | DESTINED FOR #3 7 | DESTINED FOR #2 6 |

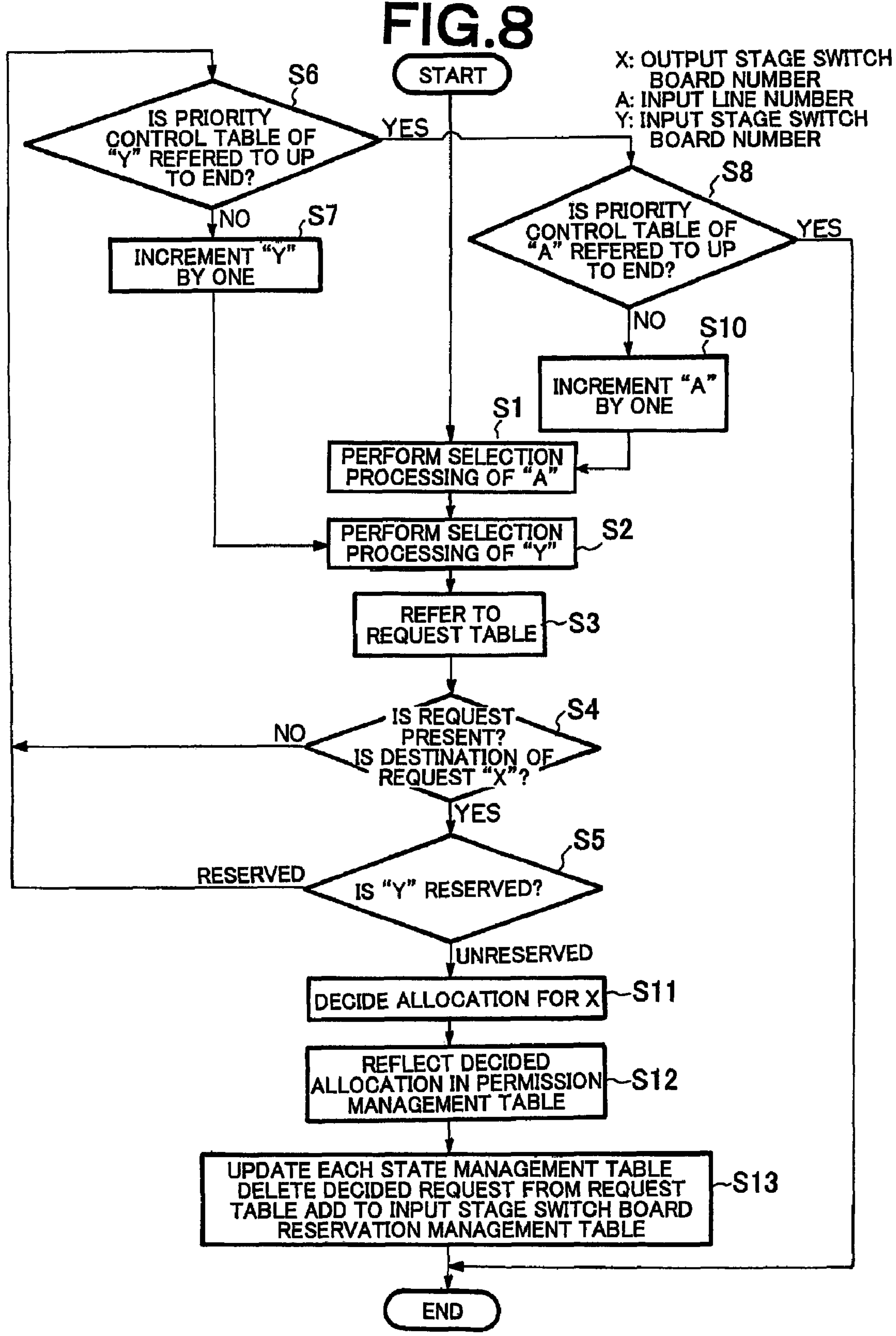
FIG.8
START
X: OUTPUT STAGE SWITCH BOARD NUMBER
A: INPUT LINE NUMBER
Y: INPUT STAGE SWITCH BOARD NUMBER
S6
IS PRIORITY CONTROL TABLE OF "Y" REFERED TO UP TO END?
YES
NO
S7
INCREMENT "Y" BY ONE
S8
IS PRIORITY CONTROL TABLE OF "A" REFERED TO UP TO END?
YES
NO
S10
INCREMENT "A" BY ONE
S1
PERFORM SELECTION PROCESSING OF "A"
PERFORM SELECTION PROCESSING OF "Y"
S2
REFER TO REQUEST TABLE
S3
IS REQUEST PRESENT? IS DESTINATION OF REQUEST "X"?
S4
NO
YES
S5
RESERVED
IS "Y" RESERVED?
UNRESERVED
DECIDE ALLOCATION FOR X
S11
REFLECT DECIDED ALLOCATION IN PERMISSION MANAGEMENT TABLE
S12
UPDATE EACH STATE MANAGEMENT TABLE DELETE DECIDED REQUEST FROM REQUEST TABLE ADD TO INPUT STAGE SWITCH BOARD RESERVATION MANAGEMENT TABLE
S13
END

FIG.9

TABLE 4 RESERVATION MANAGEMENT TABLE #1

| | INTERMEDIATE STAGE SWITCH #1 | INTERMEDIATE STAGE SWITCH #2 |
|---|---|---|
| INPUT STAGE SWITCH BOARD NUMBER #1 | 0 | 0 |
| INPUT STAGE SWITCH BOARD NUMBER #2 | 0 | 0 |
| INPUT STAGE SWITCH BOARD NUMBER #3 | 0 | 0 |

TABLE 5 PERMISSION MANAGEMENT TABLE #1

| | INPUT LINE NUMBER #1 | INPUT LINE NUMBER #2 | INPUT LINE NUMBER #3 |
|---|---|---|---|
| INPUT STAGE SWITCH BOARD NUMBER #1 | | | |
| INPUT STAGE SWITCH BOARD NUMBER #2 | | | |
| INPUT STAGE SWITCH BOARD NUMBER #3 | | | |

FIG. 10

TABLE 6 RESERVATION MANAGEMENT TABLE #1

| | INTERMEDIATE STAGE SWITCH #1 | INTERMEDIATE STAGE SWITCH #2 |
|---|---|---|
| INPUT STAGE SWITCH BOARD NUMBER #1 | 1 | 0 |
| INPUT STAGE SWITCH BOARD NUMBER #2 | 0 | 0 |
| INPUT STAGE SWITCH BOARD NUMBER #3 | 0 | 0 |

TABLE 7 PERMISSION MANAGEMENT TABLE #1

| | INPUT LINE NUMBER #1 | INPUT LINE NUMBER #2 | INPUT LINE NUMBER #3 |
|---|---|---|---|
| INPUT STAGE SWITCH BOARD NUMBER #1 | | INTERMEDIATE STAGE SWITCH #1 | |
| INPUT STAGE SWITCH BOARD NUMBER #2 | | | |
| INPUT STAGE SWITCH BOARD NUMBER #3 | | | |

FIG. 11

TABLE 8 RESERVATION MANAGEMENT TABLE #1

| | INTERMEDIATE STAGE SWITCH #1 | INTERMEDIATE STAGE SWITCH #2 |
|---|---|---|
| INPUT STAGE SWITCH BOARD NUMBER #1 | 1 | 0 |
| INPUT STAGE SWITCH BOARD NUMBER #2 | 0 | 1 |
| INPUT STAGE SWITCH BOARD NUMBER #3 | 0 | 0 |

TABLE 9 PERMISSION MANAGEMENT TABLE #1

| | INPUT LINE NUMBER #1 | INPUT LINE NUMBER #2 | INPUT LINE NUMBER #3 |
|---|---|---|---|
| INPUT STAGE SWITCH BOARD NUMBER #1 | | INTERMEDIATE STAGE SWITCH #1 | |
| INPUT STAGE SWITCH BOARD NUMBER #2 | | | INTERMEDIATE STAGE SWITCH #2 |
| INPUT STAGE SWITCH BOARD NUMBER #3 | | | |

FIG.12

TABLE 10 RESERVATION MANAGEMENT TABLE #1

| | INTERMEDIATE STAGE SWITCH #1 | INTERMEDIATE STAGE SWITCH #2 |
|---|---|---|
| INPUT STAGE SWITCH BOARD NUMBER #1 | 1 | 1 |
| INPUT STAGE SWITCH BOARD NUMBER #2 | 1 | 1 |
| INPUT STAGE SWITCH BOARD NUMBER #3 | 1 | 1 |

TABLE 11 PERMISSION MANAGEMENT TABLE #1

| | INPUT LINE NUMBER #1 | INPUT LINE NUMBER #2 | INPUT LINE NUMBER #3 |
|---|---|---|---|
| INPUT STAGE SWITCH BOARD NUMBER #1 | INTERMEDIATE STAGE SWITCH #2 | INTERMEDIATE STAGE SWITCH #1 | |
| INPUT STAGE SWITCH BOARD NUMBER #2 | | INTERMEDIATE STAGE SWITCH #1 | INTERMEDIATE STAGE SWITCH #2 |
| INPUT STAGE SWITCH BOARD NUMBER #3 | INTERMEDIATE STAGE SWITCH #2 | | INTERMEDIATE STAGE SWITCH #1 |

FIG.13

TABLE 12 RESERVATION MANAGEMENT TABLE #2

| | INTERMEDIATE STAGE SWITCH #3 | INTERMEDIATE STAGE SWITCH #4 |
|---|---|---|
| INPUT STAGE SWITCH BOARD NUMBER #1 | 0 | 1 |
| INPUT STAGE SWITCH BOARD NUMBER #2 | 1 | 0 |
| INPUT STAGE SWITCH BOARD NUMBER #3 | 1 | 1 |

TABLE 13 PERMISSION MANAGEMENT TABLE #2

| | INPUT LINE NUMBER #1 | INPUT LINE NUMBER #2 | INPUT LINE NUMBER #3 |
|---|---|---|---|
| INPUT STAGE SWITCH BOARD NUMBER #1 | | INTERMEDIATE STAGE SWITCH #4 | |
| INPUT STAGE SWITCH BOARD NUMBER #2 | | | INTERMEDIATE STAGE SWITCH #3 |
| INPUT STAGE SWITCH BOARD NUMBER #3 | | INTERMEDIATE STAGE SWITCH #4 | INTERMEDIATE STAGE SWITCH #3 |

FIG.15

| | INPUT LINE NUMBER | | INPUT STAGE SWITCH BOARD NUMBER |
|---|---|---|---|
| 1 | 1 | 1 | 1 |
| 2 | 2 | 2 | 2 |
| 3 | 3 | 3 | 3 |
| : | : | : | : |
| m | m | k | k |

FOR SCHEDULER #1

| | INPUT LINE NUMBER | | INPUT STAGE SWITCH BOARD NUMBER |
|---|---|---|---|
| 1 | m | 1 | k |
| 2 | m−1 | 2 | k−1 |
| 3 | m−2 | 3 | k−2 |
| : | : | : | : |
| m | 1 | k | 1 |

FOR SCHEDULER #2

| | INPUT LINE NUMBER | | INPUT STAGE SWITCH BOARD NUMBER |
|---|---|---|---|
| 1 | 1 | 1 | 1 |
| 2 | 2 | 2 | 2 |
| 3 | 3 | 3 | 3 |
| : | : | : | : |
| m | m | k | k |

FOR SCHEDULER #3

| | INPUT LINE NUMBER | | INPUT STAGE SWITCH BOARD NUMBER |
|---|---|---|---|
| 1 | m | 1 | k |
| 2 | m−1 | 2 | k−1 |
| 3 | m−2 | 3 | k−2 |
| : | : | : | : |
| m | 1 | k | 1 |

FOR SCHEDULER #4

RELATED ART

RELATED ART

RELATED ART

3 STACK TYPE CASE

SWITCHING DEVICE, SWITCHING METHOD, AND SWITCH CONTROL PROGRAM

TECHNICAL FIELD

The present invention relates to a switching device, a switching method, and a switch control program. More specifically, the present invention relates to a switching device including distributed schedulers capable of reducing deteriorations in throughput and fairness, and being fewer in mounting restrictions and excellent in expandability, a switching method, and a switch control program.

BACKGROUND ART

In recent years, network traffic has increasingly thickened. Because of development of optical transmission technology, a bottleneck on the network has changed from a transmission line to a switch device and a router device, and demand for a large capacity switch has risen. From economical viewpoints, however, to introduce a large capacity switch from a stage at which traffic is light is an investment in vain. Namely, at an initial stage of business, it suffices that a switch capacity is small. Therefore, a switch having expandability such that the capacity of the switch is small initially but can be increased according to an increase in the number of users, and such that the large capacity switch can be finally constructed is desired.

A multistage switch structure is known as one of methods of expanding a switch capacity. A multistage switch of this type is disclosed in Patent document 1.

The multistage switch disclosed therein is configured to include a plurality of unit switches as shown in FIG. 17. A three stage CLOS (CLOS is an inventor's name) switch, for example, is configured to include three stages of unit switch groups, i.e., an input switch group 13-1, an intermediate switch group 13-2, and an output stage switch group 13-3. The input stage switch group 13-1 is configured to include unit switch groups 13-11-1 to 13-11-*k* in each of which k m×n unit switches, where k is the number of m×n unit switches, are arranged in parallel. The m×n unit switch has m input lines and n output lines, where m is the number of input lines and n is the number of output lines. The intermediate stage switch group 13-2 is configured to include unit switch groups 13-21-1 to 13-21-*n* in each of which n k×h unit switches, where n is the number of k×h unit switches, are arranged in parallel. The k×h unit switch has k input lines and h output lines, where k is the number of input lines and h is the number of output lines. The output stage switch group 13-3 is configured to include unit switch groups 13-31-1 to 13-31-*h* in each of which h n×j unit switches, where h is the number of n×j unit switches, are arranged in parallel. The n×j unit switch has n input lines and j output lines, where n is the number of input lines and j is the number of output lines. The input stage group 13-1 is connected to the intermediate stage switch group 13-2 by a line group 13-13-1 to 13-13-(*k*×*n*), and the intermediate stage group 13-2 is connected to the output stage switch group 13-3 by a line group 13-32-1 to 13-32-(*n*×*h*), thereby constituting a switching device having a large capacity of mk×jh. In this way, with the multistage switch structure, it is possible to constitute a switch in a scale according to the number of unit switches at each stage and to the number of corresponding links, by using small-capacity unit switches.

Furthermore, various scheduling methods for the switching device have been conventionally proposed. If these scheduling methods are classified according to arrangement of functions, they are roughly divided into a scheduling method by arranging scheduling functions in a distributed fashion and a scheduling method by arranging scheduling function in a centralized fashion. FIGS. 18 and 19 show configurations disclosed in Patent document 2 and 3, respectively. The configurations of FIGS. 18 and 19 show states of conventional arrangement of scheduling functions, respectively. Specifically, FIG. 18 shows the configuration in which scheduling functions are arranged in a distributed fashion whereas FIG. 19 shows the configuration in which scheduling functions are arranged in a centralized fashion.

As shown in FIG. 18, with the configuration in which the scheduling functions are arranged in a distributed fashion, the switching device includes a plurality of switches and schedulers 14-1 to 14-*m*. By mutually connecting adjacent schedulers, the respective schedulers can transmit and receive scheduling information to and from one another, and carry out all scheduling processings.

As shown in FIG. 19, with the configuration in which the scheduling functions are arranged in a centralized fashion, a scheduler 15 is connected to all switches to provide one control circuit, thereby carrying out all scheduling processings. The centralized scheduler of this type has advantages of small wiring delay and smaller mounting restrictions caused by the wiring delay because of no need to connect a plurality of schedulers to one another. However, if a switching device is a large-scale switch, then circuit scale is made larger to disadvantageously make mounting difficult. Besides, the switching device is inferior in expandability because the number of inputs that can be accommodated is fixed after mounting.

If the switching device excellent in expandability is to be constituted, it is advantageous to use distributed schedulers. However, if the number of schedulers increases, the number of connecting lines for connecting the schedulers to one another increases, thus disadvantageously increasing mounting restrictions. Besides, the number of mounting restrictions also increases due to delay generated by exchange of information. To solve the disadvantages, there is proposed a method of carrying out scheduling processing for which the schedulers are not mutually connected and do not exchange scheduling information with one another.

Patent document 1: JP-A 2002-325087 (FIG. 17)
Patent document 2: JP-A 2002-152267 (FIG. 18)
Patent document 3: JP-A 6-70347 (FIG. 19)

DISCLOSURE OF THE INVENTION

Problems to be Solved by the Invention

However, the method of carrying out scheduling processing without exchanging the scheduling information has the following disadvantages. First, throughput is deteriorated. This is because the respective schedulers operate and make allocations independently of one another. Second, it is difficult to keep fairness in allocations.

It is an object of the present invention to provide a switching method and switching device including distributed schedulers capable of solving the conventional disadvantages and reducing deteriorations in throughput and fairness, and being fewer in mounting restrictions, and excellent in expandability.

Means for Solving the Problems

To achieve the purpose described above, according to a first aspect of the present invention, a switching device is a switching device which includes: an input stage switch group connected to a plurality of input lines; an output stage switch group connected to a plurality of output lines; an intermediate stage switch group connecting the input stage switch group to the output stage switch group; and schedulers performing scheduling operations for deciding signal paths between the input stage switch group and the output stage switch group via the intermediate stage switch group based on information input to the respective input lines, wherein the intermediate stage switch group is divided into a plurality of groups, the schedulers is arranged in a distributed fashion to correspond to the plurality of groups, respectively and the schedulers operate independently of one another.

According to a second aspect of the present invention, a switching method is a switching method for a switching device including an input stage switch group connected to a plurality of input lines; an output stage switch group connected to a plurality of output lines; and an intermediate stage switch group connecting the input stage switch group to the output stage switch group, the switching method which includes:

performing scheduling operations for deciding signal paths between the input stage switch group and the output stage switch group via the intermediate stage switch group based on information input to the respective input lines, by dividing the intermediate stage switch group into a plurality of groups and performing the scheduling operations to correspond to the plurality of groups independently of one another.

According to a third aspect of the present invention, a switch control program is a switch control program for a switching device including an input stage switch group connected to a plurality of input lines; an output stage switch group connected to a plurality of output lines; an intermediate stage switch group connecting the input stage switch group to the output stage switch group; arithmetic processing units performing scheduling operations for deciding signal paths between the input stage switch group and the output stage switch group via the intermediate stage switch group based on information input to the respective input lines; and storage units, and configured so that the intermediate stage switch group is divided into a plurality of groups, the arithmetic processing unit and storage unit are arranged in a distributed fashion to correspond to each of the plurality of groups, wherein the arithmetic processing unit performs the scheduling operation to correspond to each of the plurality of groups independently based on the information input to each of the input lines and scheduling priority processing order information stored in the storage unit.

According to the present invention, when the intermediate stage switch group is divided into a plurality of groups, schedulers are arranged in a distributed fashion to correspond to the respective groups and operate independently. It is, therefore, possible to dispense with connections among the schedulers and to dispense with mutual exchanges of scheduling information.

Effect of the Invention

According to the present invention, it is possible to provide a switching device fewer in mounting restrictions and excellent in expandability. The reason is as follows. A plurality of schedulers is not connected to one another and does not exchange scheduling information with one another. Due to this, it is possible to relax mounting restrictions such as an increase in the number of wirings and delay.

Further, even if the number of switches increases, a scheduling amount of one scheduler does not change by increasing the number of schedulers.

Moreover, according to the present invention, even if the schedulers do not exchange information with one another, deteriorations in throughput and fairness can be suppressed. This is because a scheduling start point and scheduling order can be changed according to the number of schedulers.

BRIEF DESCRIPTION OF THE DRAWINGS

FIG. 1 is a block diagram showing a configuration of a switching device according to a first embodiment of the present invention;

FIG. 6 is a table showing an example of a priority control table;

FIG. 7 is a table showing an example of a request table;

FIG. 8 is a flowchart showing a processing performed by the scheduler;

FIG. 9 is a table showing an example of a reservation management table and a permission management table;

FIG. 10 is a table showing an example of a reservation management table and a permission management table;

FIG. 11 is a table showing an example of a reservation management table and a permission management table;

FIG. 12 is a table showing an example of a reservation management table and a permission management table;

FIG. 13 is a table showing an example of a reservation management table and a permission management table;

FIG. 15 is a table showing an example of a request table;

DESCRIPTION OF REFERENCE NUMERALS

Figure 2:
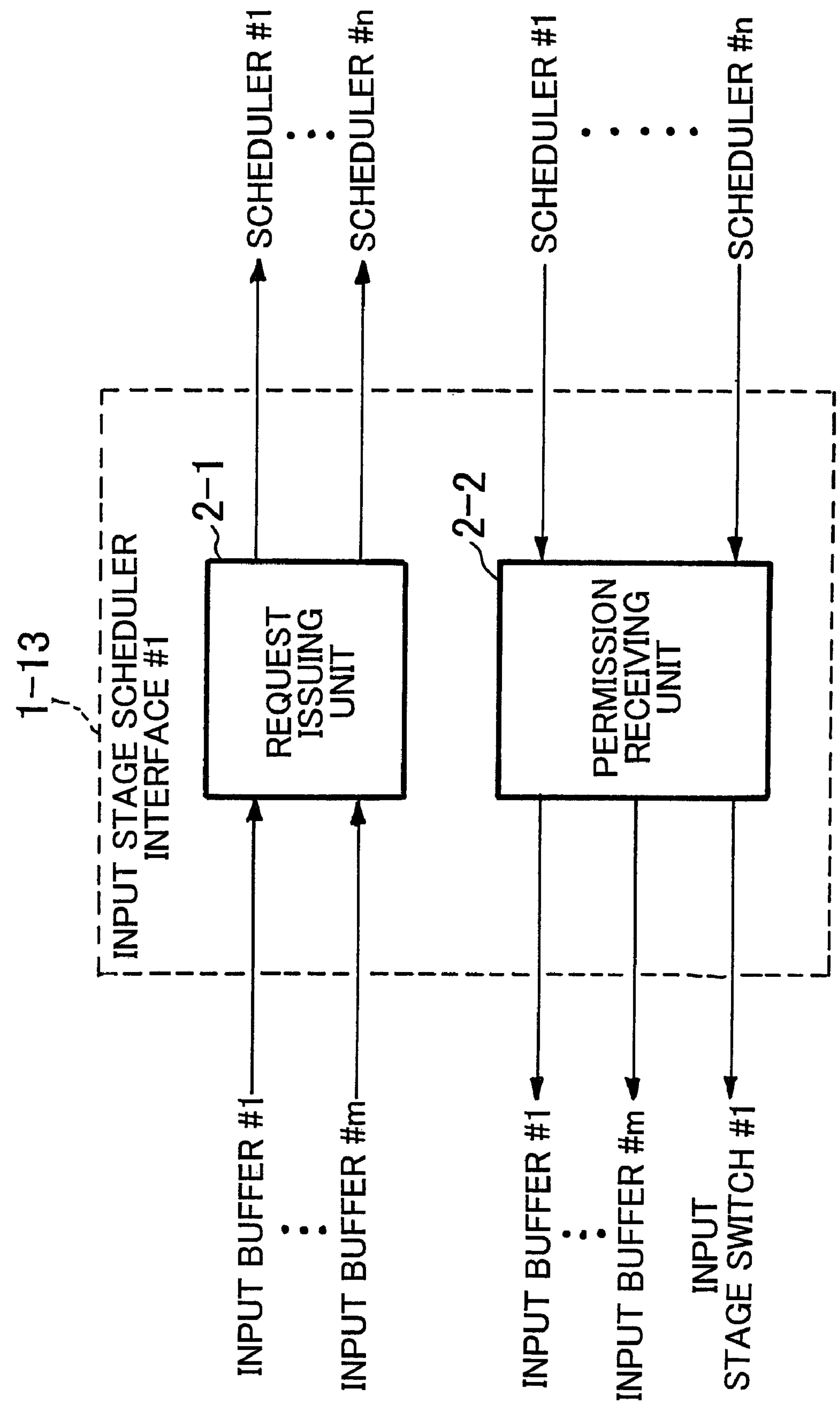
FIG. 2 is a block diagram showing a configuration of an input stage scheduler interface unit.

1-1 input stage switch group
1-2 intermediate stage switch group
1-3 output stage switch group
1-10 input stage switchboards
1-11 input buffer
1-12 input stage switch
1-13 input stage scheduler interface
1-20 intermediate stage switchboards
1-21 intermediate switch
1-22 scheduler
1-30 output stage switchboards
1-31 output buffer
1-32 output stage switch
1-33 output stage scheduler interface
2-1 request issuing unit
2-2 permission receiving unit
3-1 request receiving unit
3-2 scheduler control unit

3-3 permission issuing unit
4-1 permission receiving unit

BEST MODE FOR CARRYING OUT THE INVENTION

Most preferred embodiments of the present invention will be described hereinafter in detail with reference to the accompanying drawings.

First Embodiment (1) Description of Configuration

FIG. 1 is a block diagram showing a configuration of a switching device according to a first embodiment of the present invention. The switching device according to the first embodiment is configured to include an input stage switch group 1-1, an intermediate stage switch group 1-2, and an output stage switch group 1-3. Each of the input, intermediate, and output stage switch groups 1-1, 1-2, and 1-3 is configured to include a plurality of switchboards.

The input stage switch group 1-1 includes k input stage switchboards 1-10, and each of the input stage switchboards 1-10 includes m input buffers 1-11 (J=m×k, where J is the total number of the input buffers), an input stage switch 1-12, and an input stage scheduler interface 1-13 serving as an input stage control unit.

Each of the input buffers 1-11 is connected to an input line, and the input stage switch 1-12 and the input stage scheduler interface 1-13. The input stage switch 1-12 is connected to the m input buffers 1-11, respective intermediate stage switches 1-21 of the intermediate stage switch group 1-2, and the input stage scheduler interface 1-13.

The input stage scheduler interface 1-13 is connected to the m input buffers 1-11 and the input stage switch 1-12, and respective schedulers 1-22 of the intermediate stage switch group 1-2.

The intermediate stage switch group 1-2 is configured to include n intermediate stage switchboards 1-20, and each of the intermediate stage switchboards 1-20 is configured to include i intermediate stage switches (SW) 1-21 (L=n×i, where L is the total number of the intermediate stage switches) and a scheduler 1-22. Each of the i intermediate stage switches 1-21 is connected to the respective input stage switches 1-12 of the input stage switch group 1-1, respective output stage switches 1-32 of the output stage switch group 1-3, and to the scheduler 1-22.

The scheduler 1-22 is connected to the respective input stage scheduler interfaces 1-13, respective output scheduler interfaces 1-33, and the intermediate stage switches 1-21 on the same intermediate stage switchboard.

The output stage switch group 1-3 is configured to include h output stage switchboards 1-30, and each of the output stage switchboards 1-30 is configured to include g output buffers 1-31 (P=g×h, where P is the total number of the output buffers), an output stage switch 1-32, and an output stage scheduler interface 1-33.

Each of the output buffers 1-31 is connected to an output line, the output stage switch 1-32 and the output stage scheduler interface 1-33. The output stage switch 1-32 is connected to the g output buffers 1-31, the respective intermediate stage switches 1-21 of the intermediate stage switch group 1-2, and the output stage scheduler interface 1-33. The output stage scheduler interface 1-33 is connected to the g output buffers 1-31, the output stage switch 1-32, and the respective schedulers 1-22 of the intermediate stage switch group 1-2.

FIG. 2 is a block diagram showing a configuration of the input stage scheduler interface 1-13. The input stage scheduler interface 1-13 serving as the input stage control unit is configured to include a request issuing unit 2-1 and a permission receiving unit 2-2. The request issuing unit 2-1 is connected to the m input buffer 1-11 on the same input stage switchboard, and the schedulers 1-22 on the respective intermediate stage switchboards. The permission receiving unit 2-2 is connected to the schedulers 1-22 on the respective intermediate stage switchboards, and the m input buffers 1-11 and the input stage switch 1-12 on the same input stage switchboard.

Figure 3:
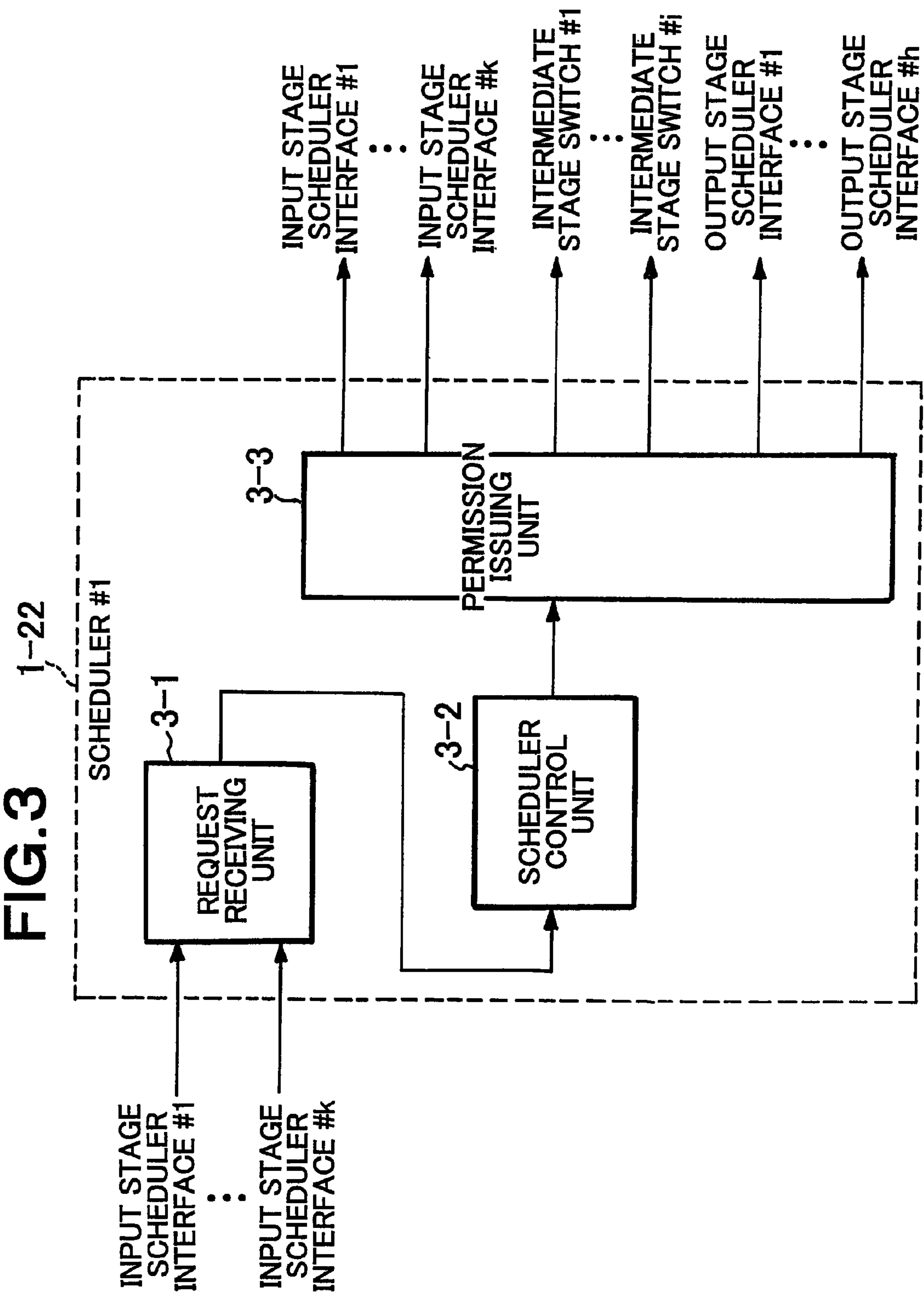
FIG. 3 is a block diagram showing a configuration of a scheduler.

FIG. 3 is a block diagram showing a configuration of the scheduler 1-22. The scheduler 1-22 is configured to include a request receiving unit 3-1, a scheduler control unit 3-2, and a permission issuing unit 3-3. The request receiving unit 3-1 is connected to the respective input stage scheduler interfaces 1-13 and the scheduler control unit 3-2 in the same scheduler. The scheduler control unit 3-2 is connected to the request receiving unit 3-1 and the permission issuing unit 3-3 in the same scheduler. The permission issuing unit 3-3 is connected to the scheduler control unit 3-2 in the same scheduler, the respective input stage scheduler interfaces 1-13, the respective output stage scheduler interfaces 1-33, and the i intermediate stage switch 1-21 on the same intermediate stage switchboard.

Figure 4:
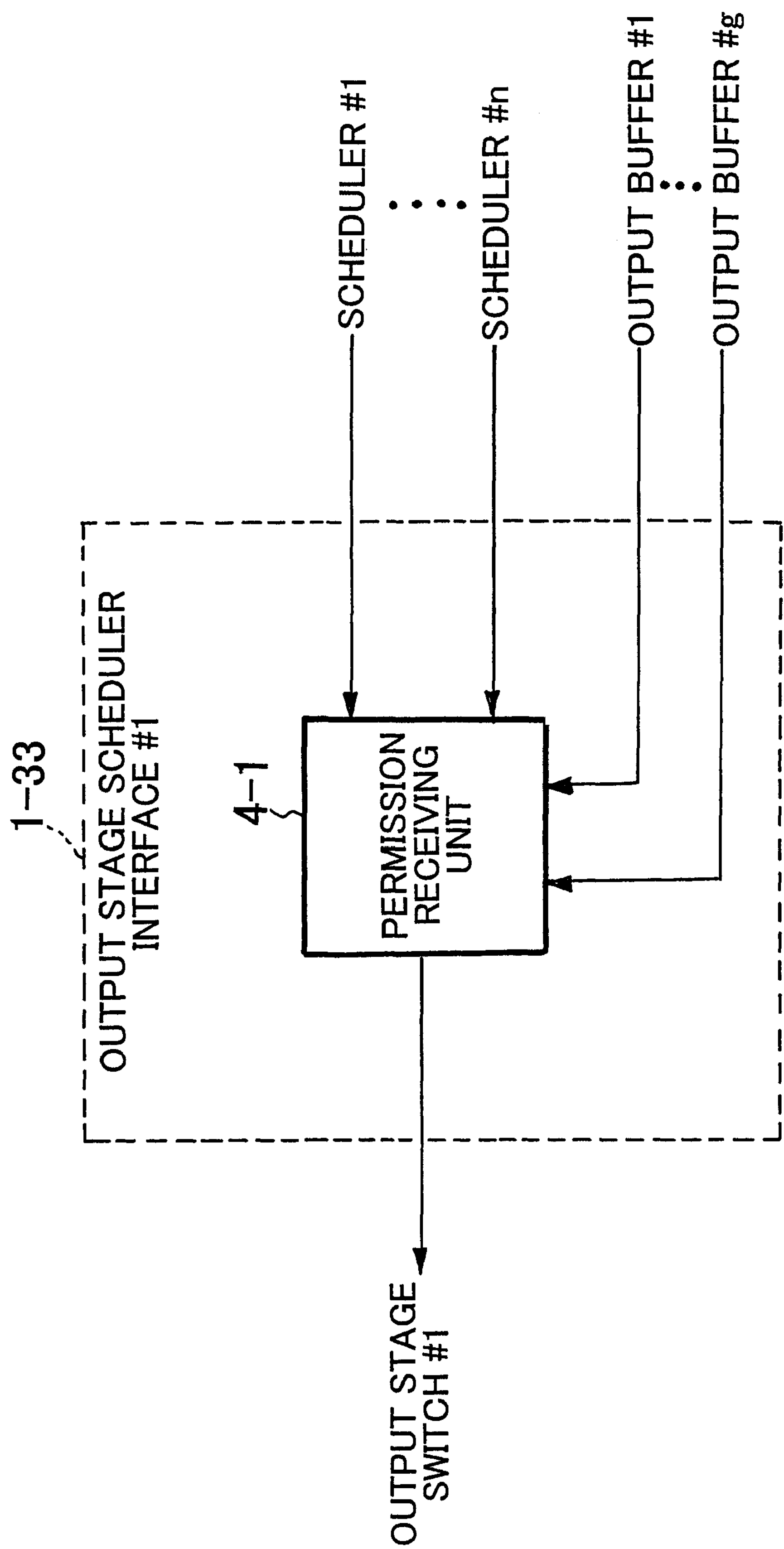
FIG. 4 is a block diagram showing a configuration of an output stage scheduler interface.

FIG. 4 is a block diagram showing a configuration of the output stage scheduler interface 1-33. The output stage scheduler interface 1-33 is configured to include a permission receiving unit 4-1. The permission receiving unit 4-1 is connected to the schedulers 1-22 on the respective intermediate switchboards, and the output stage switch 1-32 and the output buffers 1-31 on the same output stag switchboard.

(2) Description of Switching Operation

Figure 5:
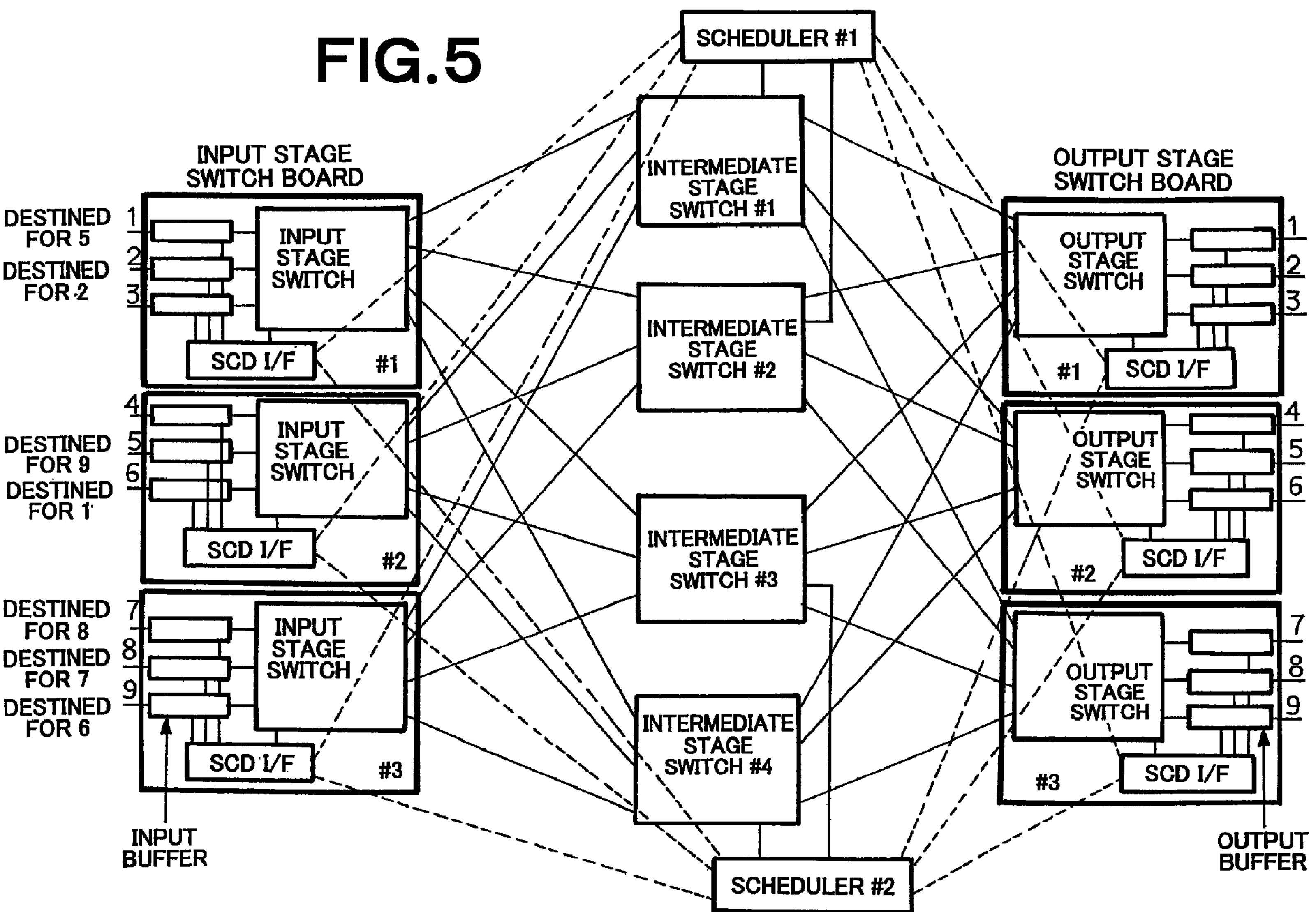
FIG. 5 is a block diagram showing a configuration of a switching device.

A switching operation performed by the switching device will be described. For brevity of description, a switching device configured as shown in FIG. 5 will be described. As shown in FIG. 5, the switching device includes three input stage switchboards (each having three ports), four intermediate stage switches, three output stage switchboards (each having three ports), and two schedulers. Each of the two schedulers controls two intermediate stage switches. Each of the three input stage switchboards includes three input buffers, an input stage switch connected to the three input buffers, and an input stage scheduler interface (denoted by SCD I/F in FIG. 5) to which the input stage switch and the three input buffers are connected. Each of the three output stage switchboards includes an output stage switch, three output buffers connected to the output stage switch, and an output stage scheduler interface (denoted by SCD I/F in FIG. 5) to which the output stage switch and the three output buffers are connected.

First, when the switching device shown in FIG. 5 is activated (or at arbitrary time), priority control tables of the schedulers #1 and #2 are set as shown in the Tables 1 and 2 of FIG. 6, respectively. The priority control tables, which are provided to correspond to the respective schedulers, specify an order of referring to a request table, to be described later, in advance. The priority control table of each scheduler is set so that operations performed by the respective schedulers do not temporally overlap one another. In the example of FIG. 5, the number of schedulers is two. Therefore, as shown in FIG. 6, the schedulers #1 and #2 set reference start positions of an input stage switchboard number (corresponding to a group number indicating each group of the input stage switch group) and an input line number to a top and an end, respectively. The scheduler #1 starting from the top position refers to the request table in an ascending order and the scheduler #2 starting from the end position refers to the request table in a descending order. By so setting the priority control table, it is possible to make efficient allocation.

Furthermore, it is decided in advance which of the input stage switch board number and the input line number is an item or a sub-item (i.e., sub-items are shifted for a certain item, the item is shifted to another item when all the sub-items are referred to, and sub-items for another item are referred to again while shifting). It is assumed that the input stage switch board numbers are sub-items and the input line numbers are items for each of the schedulers #1 and #2. It is also decided in advance the permission from which scheduler is selected in the entire system if a plurality of schedulers transmits permissions simultaneously. It is assumed herein that the permission from the scheduler #2 is selected.

It is assumed that cells (each of which is a data transfer unit having a fixed length) are input to respective input lines (i.e., input ports) of the input stage switch boards as shown in FIG. 5. In FIG. 5, input line numbers #1 to #3 of the input stage switch board #1 are indicated as "1" to "3", input line numbers #1 to #3 of the input stage switch board #2 are indicated as "4" to "6", and input line numbers #1 to #3 of the input stage switch board #3 are indicated as "7" to "9", respectively. Likewise, output line numbers #1 to #3 of the output stage switch board #1 are indicated as "1" to "3", output line numbers #1 to #3 of the output stage switch board #2 are indicated as "4" to "6", and output line numbers #1 to #3 of the output stage switch board #3 are indicated as "7" to "9", respectively.

The input cells are accumulated in input buffers #1 to #3 provided in each of the input stage switch boards. If the cells are fully accumulated in the input buffers, then the request issuing unit 2-1 (see FIG. 2) in the input stage scheduler interface (SCD I/F) reads output port numbers and output stage switch board numbers from destination information included in the cells, and transmits requests to both the schedulers #1 and #2 based on the information. If no cells arrive, the request issuing unit 2-1 does not transmit the requests. Each of the requests includes an input switch board number, an input line number, a destination output port number, and a destination output switch board number. Each of the schedulers #1 and #2 creates a request table as shown in Table 3 of FIG. 7 based on the request from the input stage scheduler interface (SCD/F) of each of the input stage switches (it is noted that the request tables created by the schedulers #1 and #2 are similar in content, i.e., similar to the request table 3 shown in FIG. 7). For example, in case of the input stage switch board of the input stage switch board number #1, if the request issuing unit 2-1 reads the output switch board number #2 and the output line number #2 (note that the output line number #2 of the output stage switch board number #2 is indicated as "5" in FIG. 5) from the cell input to the input line having the input line number #1 of the input stage switching board number #1 (note that the input line number #1 of the input stage switch board number #1 is indicated as "1" in FIG. 5) as shown in FIG. 5, the request issuing unit 2-1 transmits a request indicating the input stage switch board number #1, the input line number #1, the output switch board number #2, and the output line number #2 to each of the schedulers #1 and #2. As a result, each of the schedulers #1 and #2 creates the request table indicating the output stage switch board number #2 and the output line number #2 (the output line number is indicated as "5" in FIG. 7) for the input line (i.e., input port) having the input line number #1 of the input stage switch board number #1 ("destined for #2, 5" in the request table of FIG. 7).

As shown in FIG. 5, the scheduler #1 manages two intermediate stage switches #1 and #2, the scheduler #2 manages two intermediate stage switches #3 and #4, and the schedulers operate independently of each other.

The scheduler control unit 3-2 (see FIG. 3) of each of the schedulers performs a processing for determining to which input line a link of each intermediate stage switch to each of the output stage switch boards is to be allocated. Each scheduler refers to the request table according to the priority control table of itself. A processing performed by, for example, the scheduler #1 will be described with reference to the flowchart of FIG. 8. First, allocation of the intermediate stage switch #1 destined for the output stage switch board #1 will be described. As shown in the flowchart of FIG. 8, the scheduler #1 performs a selection processing for selecting an input line number A and an input stage switch board number Y (steps S1 and S2). Initially, the number of times of reference for the input line number is 1 and the number of times of reference for the input stage switch board number (corresponding to the component number indicating each component in the input stage switch group) is 1. Therefore, the scheduler #1 refers to the input line number #1 (A=#1) and the input stage switch board number #1 (Y=#1) on the request table (steps S1 and S2). Further, the scheduler #1 refers to a request in relation to the input line number #1 and the input stage switch board #1 on the request table, i.e., Table 3 of FIG. 7 (step S3), and checks whether a request is present and whether the destination is the output stage switch board number currently referred to (step S4). If the request is present and whether the destination is the output stage switch board number currently referred to (YES, step S4), the scheduler #1 refers to a reservation management table (0: unreserved, 1: reserved) owned by the scheduler #1, i.e., Table 4 of FIG. 9 to check whether the input stage switch board number #1 is reserved (step S5). In this case, as obvious from the request table, i.e., Table 3 of FIG. 7, a request is present on the request table in a first reference (refer to the input line number #1 and the input stage switch board #1). However, since the destination is the output stage switch board #2, the request is not selected and the first reference ends at the step S4 (i.e., since allocation of the output stage switch board #1 is made in this processing, the processing is finished without selecting the request destined for the output stage switch board #2). The processing is then moved to a step S6. It is to be noted that the scheduler #1 may create the request table either before the selection operations for selecting the input line number A and the input stage switch board number Y (steps S1 and S2) or in parallel to the steps S1 and S2.

If determining that the request is not destined for the output stage switch board currently referred to (NO, step S4), the scheduler #1 determines whether it has referred to up to the last input stage switch board numbers on the priority control table (i.e., determines whether it has referred to all of the input stage switch board numbers as sub-items) (step S6). If the scheduler #1 has not referred to all of the input stage switch board numbers, the scheduler #1 increments the input stage switch board number by one (sets Y=#2) (step S7) and returns to the step S2. If the scheduler #1 has referred to all of the input stage switch board numbers, the scheduler #1 determines whether it has referred to up to the last input line number on the priority control table (i.e., determines whether it has referred to all of the input line numbers as items) (step S8). If the scheduler #1 has not referred to all of the input line numbers, the scheduler #1 increments the input line number by one (sets A=#2) and moves to the step S1. If the scheduler #1 has referred to all of the input line numbers, the scheduler #1 finishes the processing.

A second reference to the priority control table will next be described. In this case, since all the sub-items are not referred to yet, the input line number as the item remains the previous number of #1 (NO, step S6). The scheduler #1 refers to the input stage switch board numbers as the sub-items and selects the input stage switch board number #2 corresponding to the number of times of reference 2 (i.e., the scheduler #1 increments the input stage switch board number #1 by one (Y=#2) (step S7) and selects the input stage switch board number #2 (step S2)). Next, the scheduler #1 refers to the request table (step S3). Specifically, the scheduler #1 refers to the request table with respect to the input stage switch board number #2 and the input line number #1. In this case, since no request is present with respect to the input stage switch board number #2 and the input line number #1 (step S4), the processing goes to next references (third and the following references).

In the third reference, the scheduler #1 refers to the request table with respect to the input stage switch board number #3 and the input line number #1 in a manner similarly to the first and second references (steps S6, S7, S2, and S3). In this case, a request is present with respect to the input stage switch board number #3 and input line number #1, and the input stage switch board number #3 is unreserved in the reservation management table as shown in the Table 4. Therefore, as shown in the Table 3 of FIG. 7, the destination is the output stage switch board #3 and not the output stage switch board #1, and the request is not selected.

In the fourth reference, since the scheduler #1 already refers to all the sub-items in the previous reference, the scheduler #1 also refers to the items. Accordingly, the scheduler #1 refers to the request table with respect to the input line number #2 and the input stage switch board number #1. In this case, a request is present with respect to the input line number #2 and the input stage switch board number #1, the input stage switch board number #1 is unreserved, and the destination is the output switch board #1. Therefore, allocation is decided (step S11), the scheduler #1 registers the intermediate stage switch number #1 in a relevant part of a permission management table owned by the scheduler #1, i.e. Table 5 shown in FIG. 9 (step S12), and the scheduler #1 updates a content with respect to the input stage switch board number #1 and intermediate switch number #1 to one in the reservation management table #1, i.e. Table 4 of FIG. 9. As a result, the permission management table #1 and the reservation management table #1 are updated as shown in Tables 7 and 6 of FIG. 10, respectively (step S13). Further, at the step S13, the scheduler #1 deletes a decided request from the request table. In this manner, the scheduler #1 finishes making the allocation to the intermediate stage switch #1 destined for the output stage switch board #1. Likewise, the scheduler #1 can make an allocation to the intermediate stage switch #2. Moreover, as will be described later, the scheduler #1 may perform one of the operation of allocation to the intermediate switch #1 and that of allocation to the intermediate switch #2 prior to the other operation or may perform the both operations simultaneously.

In FIG. 8, the output switch board (X) is fixed. This is because the flowchart of FIG. 8 expresses a processing per output stage switch board. Actually, however, the scheduler #1 performs the processing shown in FIG. 8 for the output stage switch board #1 independently, and performs the processing shown in FIG. 8 for the output stage switch board #2 independently.

Allocation to the intermediate stage switch #2 destined for the output stage switch board #1 will be described. If the scheduler #1 starts at the input line number #1 and the input stage switch board number #1 for reference in a similar manner stated above, then the input stage switch board number #2 and the input line number #3 are allocated, and the reservation management table and the permission management tables are updated from the Tables 6 and 7 of FIG. 10 to Tables 8 and 9 of FIG. 11, respectively.

When the scheduler #1 finishes referring to all the items, the reservation table and the permission management table owned by the scheduler #1 are updated to Tables 10 and 11 of FIG. 12, respectively. In the Table 11, since the allocation of the input stage switch board #1 is already reserved, a request of allocation of the intermediate stage switch #1 to the output stage switch board #2 with respect to the input stage switch board #1 and the input line #1 is not selected but a request with respect to the input stage switch board #3 and the input line #3 is selected, and the request from the request table is deleted from. As for allocation of the intermediate stage switch #2 to the output stage switch board #2, a request with respect to the input stage switch board #1 and the input line #1 is selected. As for allocation of the intermediate switch #1 to the output switch board #3, since allocation of the intermediate stage switch board #3 is already reserved, a request with respect to the input stage switch board #3 and the input line #1 is not selected but a request with respect to the input stage switch board #2 and the input line #2 is selected. In this manner, allocations are made.

The scheduler #2 performs scheduling similarly to the scheduler #1. However, because of the difference in the priority control table from the scheduler #1, allocations are made as shown in a reservation management table and a permission management table owned by the scheduler #2, i.e., Tables 12 and 13 of FIG. 13, respectively.

The scheduler #2 operates similarly to the processing shown in FIG. 8 except for the following respects. In the first reference, the scheduler #2 refers to the request table with respect to the input line number #3 and the input stage switch board number #3 (steps S1 and S2). Further, the scheduler #2 increments the input stage switch board number by −1 (step S7), and increments the input line number by −1 (step S10).

As for the scheduler #2, allocation of the intermediate stage switch #3 destined for the output stage switch board #1 will be described first. The scheduler #2 refers to the request table with respect to the input stage switch board #3 and the input line #3, and then to the input stage switch board #2 and the input line #3 in relation to the Tables 12 and 13. Due to this, for allocation of the intermediate stage switch #3 to the output stage switch board #1, the scheduler #2 first selects the input stage switch board #2 and the input line #3. Next, for allocation of the intermediate stage switch #4 to the output stage switch board #1, the scheduler #2 selects the input stage switch board #1 and the input line #2. For allocation of the intermediate stage switch #3 to the output stage switch board #2, the scheduler #2 selects the input stage switch board #3 and the input line #3. For allocation of the intermediate stage switch #4 to the output stage switch board #2, the scheduler #2 cannot select the input stage switch board #1 and the input line #1 since the allocation is already reserved. For allocation of the intermediate stage switch #3 to the output stage switch board #3, the scheduler #2 cannot select the input stage switch board #3 and the input line #2, the input stage switch board #2 and the input line #2, and the input stage switch board #3 and the input line #1 since the allocation is already reserved. For allocation of the intermediate stage switch #4 to the output stage switch board #3, the scheduler #2 selects the input stage switch board #3 and the input line #2. In this manner, allocations are made.

The schedulers #1 and #2 can perform the operation shown in the flowchart of FIG. 8 either in parallel with respect to the respective output stage switch boards or in parallel with respect to the respective intermediate stage switches. If the schedulers #1 and #2 can perform the operation shown in the flowchart of FIG. 8 in parallel with respect to the respective intermediate stage switches, then it is possible to avoid overlap in the parallel processing by allowing the respective intermediate stage switch boards to own priority control tables in which the input line numbers or the input stage switch board numbers are shifted from one another in the same group, by shifting the output stage switch boards to be selected by the respective intermediate stage switches (e.g., if the intermediate stage switches #1 and #2 are allocated in parallel, then the allocation of the intermediate stage switch #1 starts at the output stage switch board number #1 and the allocation of the intermediate stage switch #2 starts at the output stage switch board number #2), or by carrying out the both. Moreover, the schedulers #1 and #2 can perform the operation in parallel. By performing the operation in parallel, it is possible to shorten calculation time for scheduling.

Upon completion of the scheduling, the permission issuing unit 3-3 (see FIG. 3) transmits a permission signal to each input stage scheduler interface (SCD I/F) based on the permission management table. At the same time, the permission issuing unit 3-3 transmits control information on the respective switches to each input stage scheduler interface (SCD I/F) and each output stage scheduler interface (SCD I/F). The input buffers, the input stage switches, the intermediate stage switches, and the output stage switches are set based on the control information, respectively. If a plurality of schedulers transmits permissions to one input stage scheduler interface, the input stage scheduler interface selects any one of the permissions. For example, the input stage scheduler interface decides a preferential scheduler in advance. At this moment, the input stage scheduler interface does not notify the schedulers of selection of the permission, and causes the permitted input buffers to output packets. The packets passing through the respective switches are accumulated in the destination output buffers and output to the respective output lines.

In this case, the input stage switches set the port 1 (i.e., the input line number #1) to be connected to the intermediate stage switch #2, the port 2 to be connected to the intermediate stage switch #4, the port 5 to be connected to the intermediate stage switch #1, the port 6 to be connected to the intermediate stage switch #3, the port 7 to be connected to the intermediate stage switch #2, the port 8 to be connected to the intermediate stage switch #4, and the port 9 to be connected to the intermediate stage switch #3. Furthermore, the output stage switches set the port 1 (i.e., the output line number #1) to be connected by the intermediate stage switch #3, the port 2 to be connected by the intermediate stage switch #4, the port 5 to be connected by the intermediate stage switch #2, the port 6 to be connected by the intermediate stage switch #3, the port 7 to be connected by the intermediate stage switch #4, the port 8 to be connected by the intermediate stage switch #2, and the port 9 to be connected by the intermediate stage switch #1. As already described, if the schedulers #1 and #2 transmit permissions to one input stage switch, the input stage switch selects the permission from the scheduler #2.

At the same time, the intermediate stage switches are set by the respective schedulers. In this case, the intermediate stage switch #1 is set to connect the input stage switch #1 to the output stage switch #1, connect the input stage switch #2 to the output stage switch #3, and connect the input stage switch #3 to the output stage switch #2. The intermediate stage switch #2 is set to connect the input stage switch #1 to the output stage switch #2, connect the input stage switch #2 to the output stage switch #1, and connect the input stage switch #3 to the output stage switch #3. The intermediate stage switch #3 is set to connect the input stage switch #1 to the output stage switch #3, connect the input stage switch #2 to the output stage switch #1, and connect the input stage switch #3 to the output stage switch #2. The intermediate stage switch #4 is set to connect the input stage switch #1 to the output stage switch #1, connect the input stage switch #2 to the output stage switch #2, and connect the input stage switch #3 to the output stage switch #3. Upon completion of settings of the switches, the input buffers transmit cells and the cells arrive at destination output ports, respectively.

Second Embodiment

A second embodiment of the present invention will be described.

Figure 14:
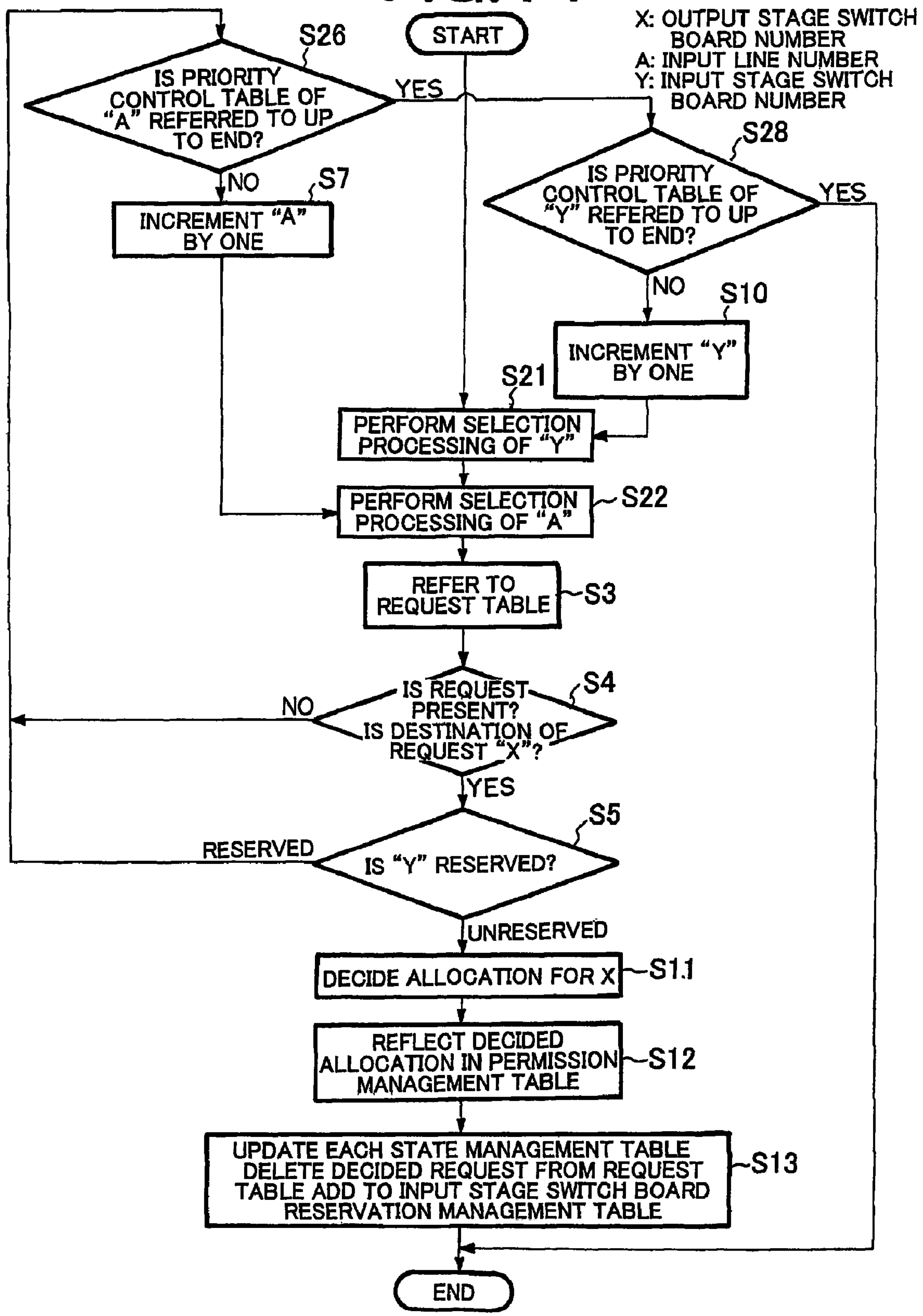
FIG. 14 is a flowchart showing a processing performed by the scheduler.

Even if a switching device performs a scheduling operation in which an order of selection processings for the input line number and the input stage switch board number is replaced as shown in the flowchart of FIG. 14, the switching device can perform a switching operation similarly to the first embodiment. The flowchart of FIG. 14 is similar to the flowchart of FIG. 8 except that the input line number is replaced by the input stage switch board number and the input stage switch board number is replaced by the input line number at steps S21, S22, S26, S27, S7, and S10. The flowchart of FIG. 14 shows a flow with respect to the priority control table #1 shown in FIG. 6. A flow with respect to the priority control table #2 differs from the flow shown in FIG. 14 in that the input line number is incremented by −1 at the step S7 and the input stage switch board number is incremented by −1 at the step S10.

Third Embodiment

A third embodiment of the present invention will be described.

If a switching device includes four schedulers #1 to #4, priority control tables are set to correspond to the four schedulers, respectively as shown in FIG. 15. Each of the schedulers #1 and #2 performs the scheduling operation shown in the flowchart of FIG. 8 (except that the input stage switch board number is incremented by −1 at the step S7 and the input line number is incremented by −1 at the step S10 for the scheduler #2). Each of the schedulers #3 and #4 perform the scheduling operation shown in the flowchart of FIG. 14 (except that the input line number is incremented by −1 at the step S7 and the input stage switch board number is incremented by −1 at the step S10 for the scheduler #4). It is thereby possible to make efficient allocations.

A reference start position of each of the schedulers #1 and #3 is a top position and that of each of the schedulers #2 and #4 is an end position. Each of the schedulers #1 and #2 refers to the request table in which the input line numbers are items and the input stage board numbers are sub-items. Each of the schedulers #3 and #4 refers to the request table in which the input stage board numbers are items and the input line numbers are sub-items.

Namely, the scheduler #1 refers to the request table at the reference start position at which the input line number "1" and the input stage switch board number "1" are present, in an ascending direction of the input stage switch board number. The scheduler #2 refers to the request table at the reference start position at which an input line number "m" and an input stage switch board number "k" are present, in a descending direction of the input stage switch board number. The scheduler #3 refers to the request table at the reference start position at which the input line number "1" and the input stage switch board number "1" are present, in an ascending direction of the input stage switch board number. The scheduler #4 refers to the request table at the reference start position at which the input line number "m" and the input stage switch board number "k" are present, in a descending direction of the input stage switch board number.

In the embodiments stated so far, the schedulers are not connected to one another and do not exchange scheduling information with one another. It is, therefore, possible to relax mounting restrictions such as an increase in the number of wirings and delay. Moreover, a plurality of schedulers can efficiently perform scheduling processing independently by changing scheduling methods according to the number of schedulers. Furthermore, even if a switch capacity increases, the number of switches for which one scheduler is responsible remains unchanged and a calculation amount of each scheduler remains unchanged. It is, therefore, possible to use a large capacity switch. Accordingly, it is possible to provide a large capacity switching device having expandability.

Figure 16:
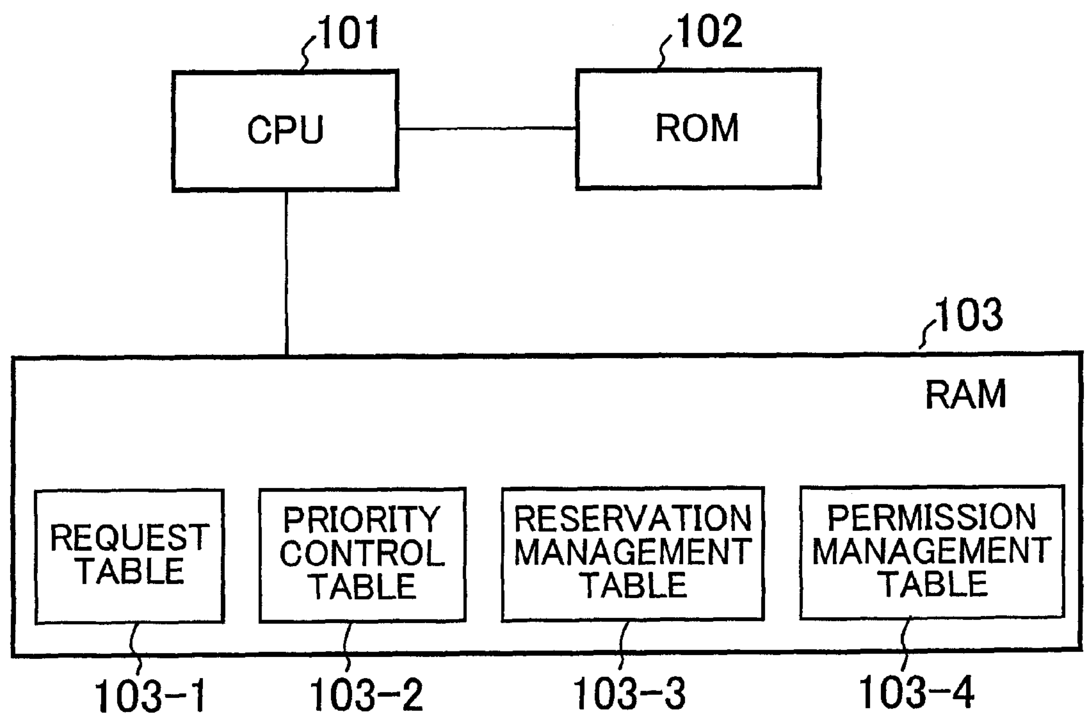
FIG. 16 is a schematic diagram showing a configuration of the scheduler if a scheduling processing is performed by software.
Figure 17:
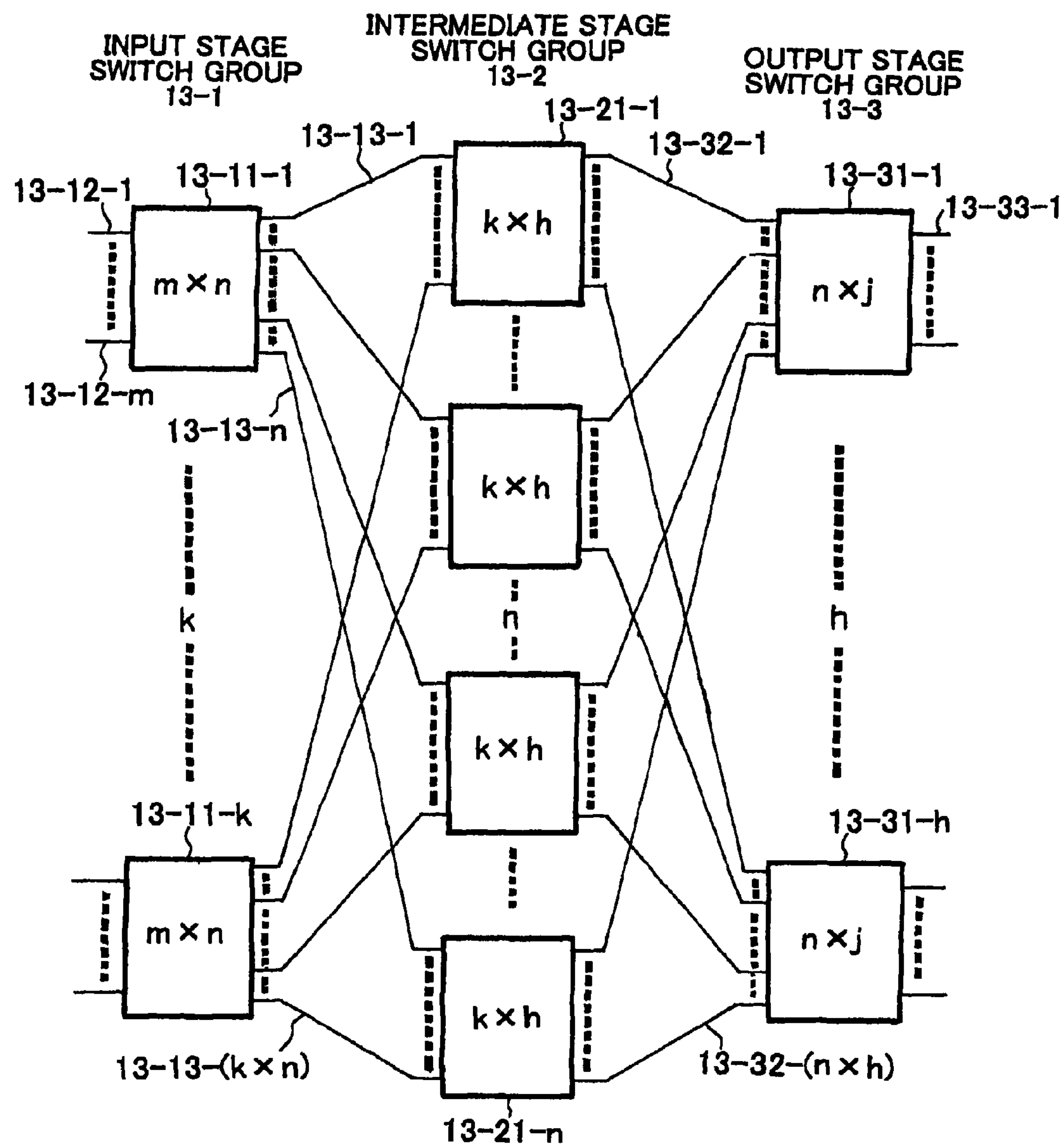
FIG. 17 is a schematic diagram showing a conventional multistage switch.
Figure 18:
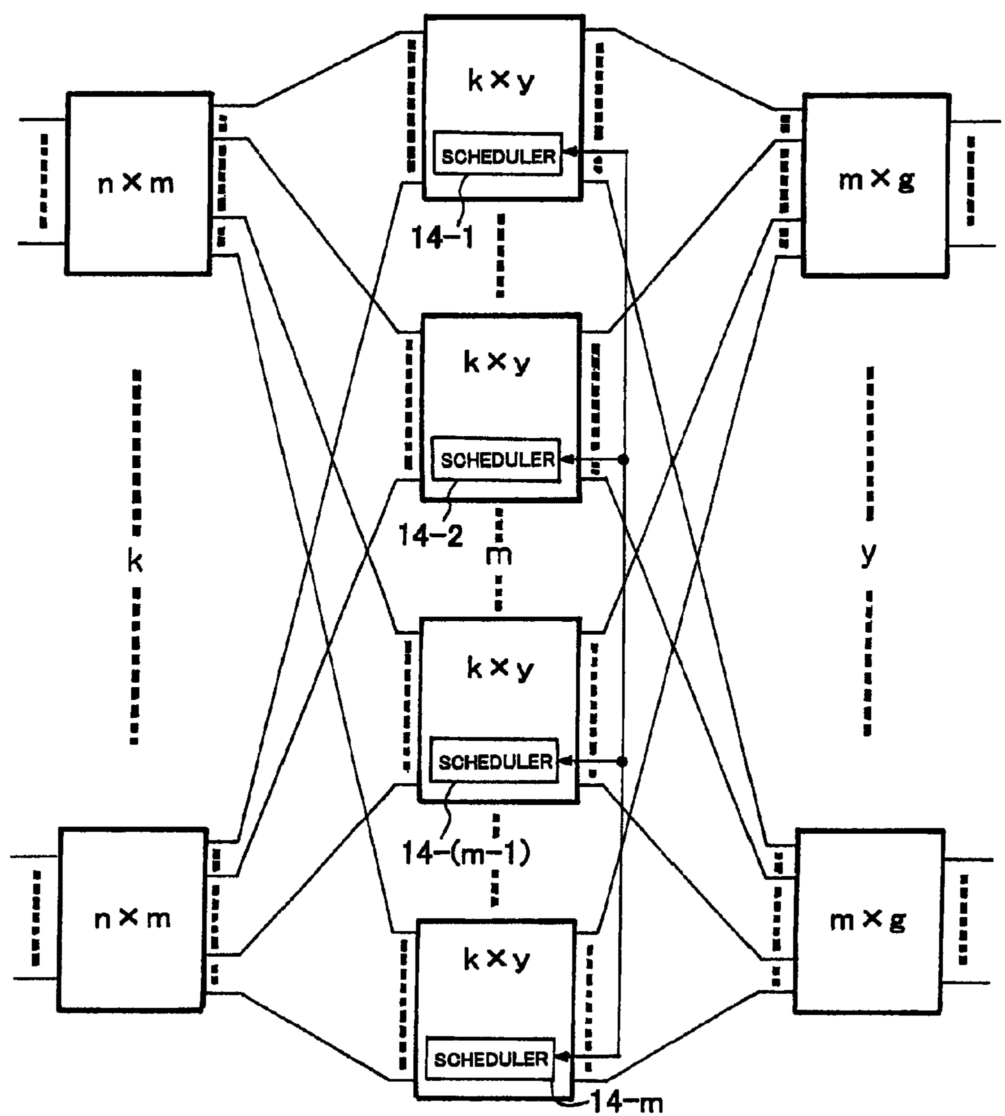
FIG. 18 is a schematic diagram showing a conventional distributed scheduler.
Figure 19:
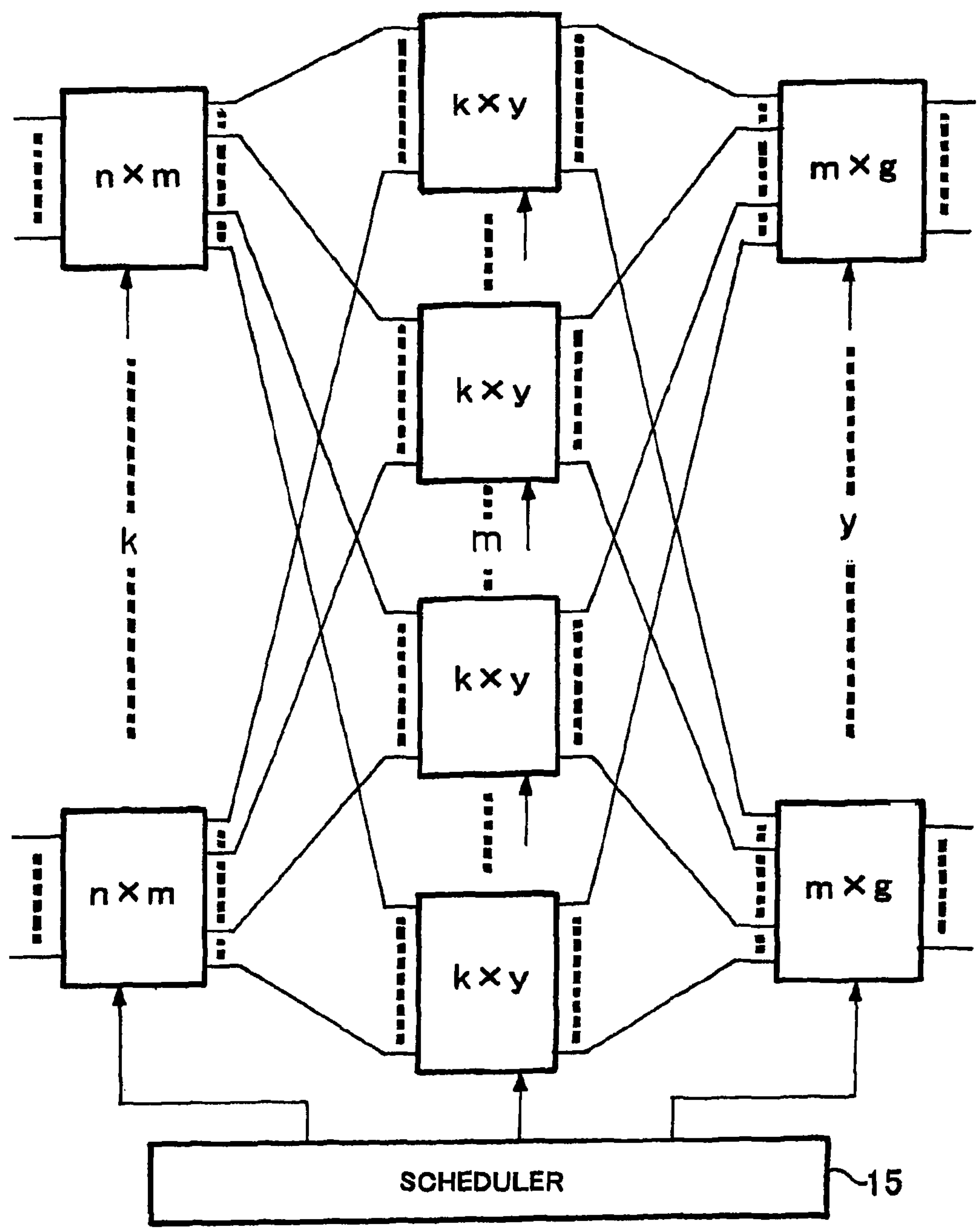
FIG. 19 is a schematic diagram showing a conventional centralized scheduler.

The scheduling processing according to each of the embodiments can be realized by using a dedicated IC such as a schedule arithmetic processing LSI as a scheduler. Alternatively, as shown in FIG. 16, the scheduling processing can be realized by software (i.e., using a computer) using, for example, a ROM (Read Only Memory) 102 storing therein a program describing the scheduling processing shown in, for example, FIG. 8 or 14, a CPU (Central Processing Unit) 101 (to serve as an arithmetic processing unit) performing a processing for executing the program, and a RAM (Random Access Memory) 103 storing therein information on a request table 103-1, a priority control table 103-2, a reservation management table 103-3, and a permission management table 103-4, request information and the like. The information on the priority control table 103-2 is set in advance and stored in a memory, e.g., a flash memory in which information is non-erasable. Alternatively, the information on the priority control table 103-2 may be stored in the ROM.

Furthermore, the schedulers according to each embodiment are provided in the intermediate stage switch boards, respectively. Alternatively, the schedulers may be provided in the input stage switch boards or output stage switch boards, respectively. For example, if a scheduler is arranged in each of the input stage switch board, it suffices that an intermediate stage scheduler interface is arranged in each of the intermediate stage switch board to control the corresponding intermediate stage switch. In another alternative, schedulers may be arranged in boards other than the intermediate stage switch boards, the input stage switch boards, and the output stage switch boards, and scheduler interfaces may be provided in the intermediate stage switch boards, the input stage switch boards, and the output stage switch boards, respectively.

An embodiment in which the switching device according to each of the first to third embodiments is configured as a stack switching device will be described.

Figure 20:
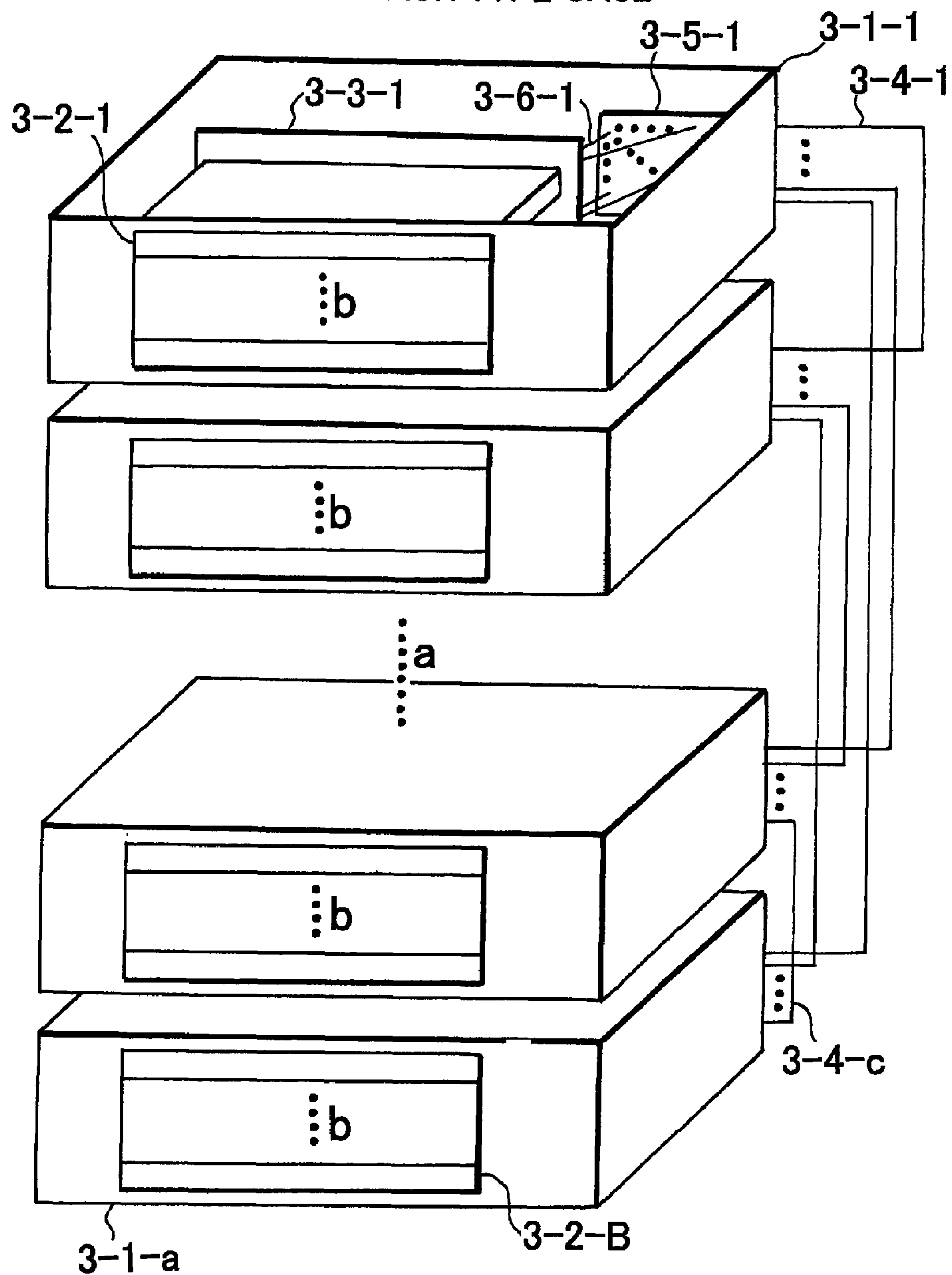
FIG. 20 is a schematic diagram showing a stack case containing switchboards of the switching device according to the present invention.

FIG. 20 shows a stack case accommodating therein switch boards of the switching device according to each of the first to third embodiments of the present invention. A stack case 3 shown in FIG. 20 includes sub-cases 3-1-1 to 3-1-_a_. Each of the sub-cases includes slots 3-2-1 to 3-2-B (where B=2k+n), back planes 3-3-1 to 3-3-B and inter-case connecting connectors 3-5-1 to 3-5-B. The respective slots 3-2-1 to 3-2-B accommodate therein b input stage switch boards 1-10, where b is the number of input stage switch boards 1-10, output stage switch boards 1-30 or intermediate stage switch boards 1-20. The respective back planes 3-3-1 to 3-3-B are connected between the b input stage switch boards 1-10, the output stage switch boards 1-30 or the intermediate stage switch boards 1-20 in each of the sub-cases 3-1-1 to 3-1-_a_ to one another. The inter-case connecting connectors 3-5-1 to 3-5-B include inter-case interconnection lines 3-4-1 to 3-4-C (where C=2M+2N+i) connected to the back planes 3-3-1 to 3-3-B. The back planes 3-3-1 to 3-3-B are connected to the inter-case connecting connectors 3-5-1 to 3-5-B by back plane-to-connector connection lines 3-6-1 to 3-6-_d_.

An optical connection transceiver is mounted in each of the input stage switches, the intermediate stage switches, the output stage switches, the input stage scheduler interfaces, schedulers, and the output stage scheduler interfaces. Optical wirings are arranged among the input stage switch boards, the intermediate stage switch boards, and the output stage switch boards. These optical wirings are connected to the back planes in the respective sub-cases. The back plane-to-connector connection lines are also constituted by optical wirings and connected to the inter-case connecting connectors. The inter-case interconnection lines are similarly constituted by optical wirings and mutually connect the respective cases.

The present invention can be carried out in other various manners without departure from the spirit or essential features of the present invention. Therefore, the above-stated embodiments are given only for illustrative purposes and should not be interpreted to limit the invention. The scope of the present invention is defined by claims and not at all constrained by the description of the specification. Moreover, all changes and modifications in an equivalent range to the claims fall within the scope of the present invention.

The invention claimed is:

1. A switching device comprising:

an input stage switch group connected to a plurality of input lines, said input stage switch group comprising a plurality of input stage switches;

an output stage switch group connected to a plurality of output lines, said output stage switch group comprising a plurality of output stage switches;

an intermediate stage switch group connecting the input stage switch group to the output stage switch group, said intermediate stage switch group comprising a plurality of intermediate stage switches; and schedulers performing scheduling operations for deciding signal paths between the input stage switch group and the output stage switch group via the intermediate stage switch group based on information input to the respective input lines, wherein the intermediate stage switch group is divided into a plurality of groups of intermediate stage switches, at least one of the groups of intermediate stage switches comprising a plurality of intermediate stage switches, the schedulers are arranged to correspond to the plurality of groups, respectively, and the schedulers operate independently of one another, wherein the number of the plurality of groups of intermediate stage switches is smaller than the number of all the intermediate stage switches of said intermediate stage switch group, the number of the schedulers is equal to the number of the plurality of groups of intermediate stage switches, and the intermediate stage switches are connected to each of the plurality of input stage switches through a plurality of lines, wherein in the at least one of the groups of intermediate stage switches, the scheduler corresponding to the at least one of the groups performs scheduling operation of the plurality of intermediate stage switches included in the at least one of the groups, and wherein the respective schedulers perform the scheduling operations based on priority orders different among the schedulers, the input stage switch group is divided into a plurality of groups, and each of the schedulers decides the priority order based on an input line number and a group number indicating each of the plurality of groups divided from the input stage switch group.

2. The switching device according to claim 1, wherein the respective schedulers perform the scheduling operations in parallel.

3. The switching device according to claim 1, wherein the respective schedulers do not share scheduling information on intermediate stage switches managed in the plurality of groups.

4. The switching device according to claim 1, further comprising an input stage control unit controlling input stage switches in the input stage switch group, wherein the input stage control unit does not transmit selection information on intermediate stage switches to be connected to the input stage switches to the schedulers.

5. The switching device according to claim 1, wherein each of the schedulers manages a scheduling start point and a scheduling order.

6. A switching device comprising:

an input stage switch group connected to a plurality of input lines;

an output stage switch group connected to a plurality of output lines;

an intermediate stage switch group connecting the input stage switch group to the output stage switch group; and schedulers performing scheduling operations for deciding signal paths between the input stage switch group and the output stage switch group via the intermediate stage switch group based on information input to the respective input lines, wherein the intermediate stage switch group is divided into a plurality of groups, the schedulers are arranged to correspond to the plurality of groups, respectively and the schedulers operate independently of one another;

wherein the respective schedulers perform the scheduling operations based on priority orders different among the schedulers;

wherein the input stage switch group is divided into a plurality of groups, and each of the schedulers decides the priority order based on an input line number and a group number indicating each of the plurality of groups divided from the input stage switch group;

wherein one or two or more schedulers among the plurality of schedulers perform the scheduling operation by selecting one of or both of the input line number and the group number in an ascending direction of number for one of or both of the input line number and the group number, and remaining schedulers perform the scheduling operation by selecting one of or both of the input line number and the group number in a descending direction of number for one of or both of the input line number and the group number.

7. A switching device comprising:

an input stage switch group connected to a plurality of input lines;

an output stage switch group connected to a plurality of output lines;

an intermediate stage switch group connecting the input stage switch group to the output stage switch group; and schedulers performing scheduling operations for deciding signal paths between the input stage switch group and the output stage switch group via the intermediate stage switch group based on information input to the respective input lines, wherein the intermediate stage switch group is divided into a plurality of groups, the schedulers are arranged to correspond to the plurality of groups, respectively and the schedulers operate independently of one another;

wherein the respective schedulers perform the scheduling operations based on priority orders different among the schedulers;

wherein the input stage switch group is divided into a plurality of groups, and each of the schedulers decides the priority order based on an input line number and a group number indicating each of the plurality of groups divided from the input stage switch group;

wherein each of the schedulers performs a processing for selecting the input line number, sequentially selecting the group number on the selected input line number, changing the input line number after end of selection of the group number, and sequentially selecting the group number on the changed input line number.

8. A switching device comprising:

an input stage switch group connected to a plurality of input lines;

an output stage switch group connected to a plurality of output lines;

an intermediate stage switch group connecting the input stage switch group to the output stage switch group; and schedulers performing scheduling operations for deciding signal paths between the input stage switch group and the output stage switch group via the intermediate stage switch group based on information input to the respective input lines, wherein the intermediate stage switch group is divided into a plurality of groups, the schedulers are arranged to correspond to the plurality of groups, respectively and the schedulers operate independently of one another;

wherein the respective schedulers perform the scheduling operations based on priority orders different among the schedulers;

wherein the input stage switch group is divided into a plurality of groups, and each of the schedulers decides the priority order based on an input line number and a group number indicating each of the plurality of groups divided from the input stage switch group;

wherein each of the schedulers performs a processing for selecting the group number, sequentially selecting the input line number on the selected group number, changing the group number after end of selection of the input line number, and sequentially selecting the input line number on the changed group number.

9. A switching method for a switching device including:

an input stage switch group connected to a plurality of input lines, said input stage switch group comprising a plurality of input stage switches;

an output stage switch group connected to a plurality of output lines, said output stage switch group comprising a plurality of output stage switches; and an intermediate stage switch group connecting the input stage switch group to the output stage switch group, said intermediate stage switch group comprising a plurality of intermediate stage switches;

the switching method comprising:

performing, by the switching device, scheduling operations for deciding signal paths between the input stage switch group and the output stage switch group via the intermediate stage switch group based on information input to the respective input lines, by dividing the intermediate stage switch group into a plurality of groups of intermediate stage switches, at least one of the groups of intermediate stage switches comprising a plurality of intermediate stage switches and performing the scheduling operations for each of the plurality of groups of intermediate stage switches independently of one another, wherein the number of the plurality of groups of intermediate stage switches is smaller than the number of all the intermediate stage switches of said intermediate stage switch group, the number of the schedulers is equal to the number of the plurality of groups of intermediate stage switches, and the intermediate stage switches are connected to each of the plurality of input stage switches through a plurality of lines, wherein in the at least one of the groups of intermediate stage switches, the scheduler corresponding to the at least one of the groups performs scheduling operation of the plurality of intermediate stage switches included in the at least one of the groups, and wherein the respective scheduling operations are performed based on priority orders different among the plurality of groups, the input stage switch group is divided into a plurality of groups, and each of the scheduling operations is decided in the priority order based on an input line number and a group number indicating each of the plurality of groups divided from the input stage switch group.

10. A non-transitory computer readable medium having stored thereon a switch control program for causing computer to operate as a switching device, said switching device including:

an input stage switch group connected to a plurality of input lines, said input stage switch group comprising a plurality of input stage switches;

an output stage switch group connected to a plurality of output lines, said output stage switch group comprising a plurality of output stage switches;

an intermediate stage switch group connecting the input stage switch group to the output stage switch group, said intermediate stage switch group comprising a plurality of intermediate stage switches;

a plurality of arithmetic processing units;

one or more storage units;

said switching program causing a plurality of said arithmetic processing units to perform scheduling operations for deciding signal paths between the input stage switch group and the output stage switch group via the intermediate stage switch group based on information input to the respective input lines; and said switching program configuring the switching device so that the intermediate stage switch group is divided into a plurality of groups of intermediate stage switches, at least one of the groups of intermediate stage switches comprising a plurality of intermediate stage switches, and so that the arithmetic processing unit and storage unit are arranged to correspond to each of the plurality of groups, wherein, said switching program causes each of the plurality of arithmetic processing units to perform the scheduling operation for the corresponding group of the plurality of groups independently based on the information input to each of the input lines and scheduling priority processing order information stored in the storage unit, wherein the number of the plurality of groups of intermediate stage switches is smaller than the number of all the intermediate stage switches of said intermediate stage switch group, the number of the schedulers is equal to the number of the plurality of groups of intermediate stage switches, the intermediate stage switches are connected to each of the plurality of input stage switches through a plurality of lines, wherein in the at least one of the groups of intermediate stage switches, the scheduler corresponding to the at least one of the groups performs scheduling operation of the plurality of intermediate stage switches included in the at least one of the groups, and wherein the respective scheduling operations are performed based on priority orders different among the plurality of groups, the input stage switch group is divided into a plurality of groups, and each of the scheduling operations is decided in the priority order based on an input line number and a group number indicating each of the plurality of groups divided from the input stage switch group.

* * * * *